United States Patent [19]

Van Dyke

[11] Patent Number: 4,938,324

[45] Date of Patent: Jul. 3, 1990

[54] AUTOMATIC DERAILLEUR SHIFTER

[75] Inventor: Laroy J. Van Dyke, Audubon, Pa.

[73] Assignee: Bike-O-Matic, Inc., Audubon, Pa.

[21] Appl. No.: 279,860

[22] Filed: Dec. 5, 1988

[51] Int. Cl.⁵ .............................. F16F 9/34; F16H 9/00
[52] U.S. Cl. ..................................... 188/317; 188/282; 188/316; 474/80; 474/82
[58] Field of Search .................... 188/317, 316, 322.15, 188/311, 312, 288, 281, 282, 322.18; 474/80, 82

[56] References Cited

U.S. PATENT DOCUMENTS

| | | | |
|---|---|---|---|
| 2,405,062 | 7/1946 | Sheldon | 188/317 |
| 2,507,268 | 5/1950 | Patriquin | 188/316 |
| 4,036,319 | 7/1977 | Andre | 188/282 |
| 4,474,271 | 10/1984 | Mölders et al. | 188/282 |
| 4,503,951 | 3/1985 | Imaizumi | 188/317 |
| 4,599,072 | 7/1986 | Chappell | 474/80 |
| 4,662,486 | 5/1987 | Stenberg | 188/312 |

FOREIGN PATENT DOCUMENTS 1068251  6/1954  France .............................. 188/282

Primary Examiner—Andres Kashnikow
Assistant Examiner—Matthew C. Graham
Attorney, Agent, or Firm—Steele, Gould & Fried

[57]  ABSTRACT

An automatic derailleur shifter is disclosed which includes a hollow cylinder body and a piston rod movable within the cylinder. The piston rod carries a dual element piston within the cylinder body in a manner to permit substantially unrestricted fluid flow through the piston when the piston rod is moved in a first, upward direction and a greatly restricted fluid flow when the piston rod is moved in the second downward direction. A first, fixed piston element is fabricated of diameter less than the inner diameter of the cylinder to allow unrestricted fluid flow thereabout. A second, movable piston element is provided and below the fixed piston element includes a flared skirt for sliding, sealing engagement between the movable piston element and the cylinder. A small, restricted longitudinal channel is provided through the fixed piston element which terminates at its lower end at a circular channel. The circular channel is downwardly closed to form a restricted hydraulic fluid passage when the movable piston element is urged against the fixed piston element of the piston rod in the second direction to thereby restrict the speed of piston rod movement in the second direction.

8 Claims, 2 Drawing Sheets

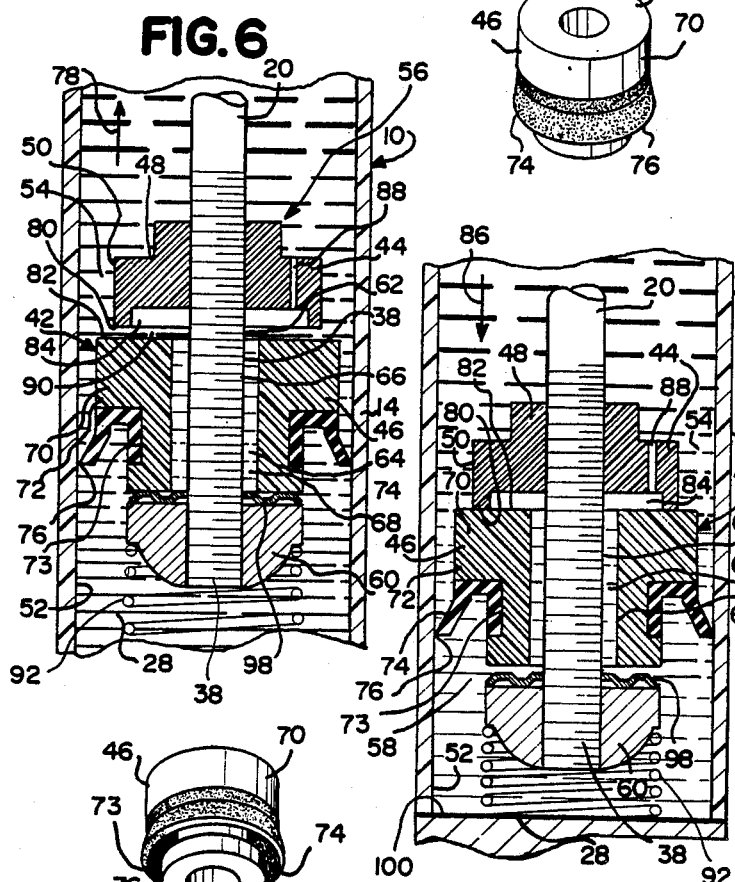

AUTOMATIC DERAILLEUR SHIFTER

BACKGROUND OF THE INVENTION

1. Field of the Invention

The present invention relates generally to the field of transmissions for multi-speed bicycles, and more particularly, relates to an automatic derailleur shifter featuring an improved hydraulic cylinder having a floating piston and means to precisely control the rate of fluid passage through and about the piston.

2. Description of the Prior Art

As set forth in U.S. Pat. Nos. 4,599,079 and 4,693,700, which patents are owned by the assignee of the presention application, a shifting device for derailleurs has been disclosed which features a small hydraulic cylinder for use as a stabilizing means to control and slow the pivotal movement of the movable shifter arm. Cylinders including hydraulic cylinders and pneumatic cylinders of various and numerous designs and configurations are known and have long been developed by prior workers in the art.

Experience has shown that while the design of the previously disclosed hydraulic cylinder is technically and practically correct, the efficient manufacture of this particular design has proved to be relatively difficult. Because of this, the precise timing and control of the piston movement has presented operating problems when the currently available automatic derailleur shifters were placed in use.

Specifically, the function of the hydraulic cylinder in the automatic derailleur shifter system is dependant upon the rather precisely controlled flow of hydraulic fluid through and about the piston as the piston is moved relative to the cylinder. In a small hydraulic cylinder of the type designed for use with an automatic derailleur shifter, it has been found that the correct flow of the hydraulic fluid can be properly controlled within the predetermined parameters only when the parts are accurately made within the designed tolerances. When the required tolerances cannot be maintained either through precise manufacturing techniques or by elimination of out-sized parts through extensive quality control procedures, the proper functioning of the hydraulic cylinder cannot be assured. In fact, it has been found that proper functioning hydraulic cylinders could be produced only when the parts either were made by hand and each part individually measured or when the parts were mass produced and then subjected to 100% quality control measurements and checking. Either of these procedures can greatly increase the cost of the finished part and has made the expense of producing a properly functioning hydraulic cylinder disproportionate to the expense of the automatic derailleur shifter in its entirety.

Accordingly, the need remains to provide a hydraulic cylinder suitable for use with an automatic derailleur shifter and for other associations that is capable of being mass produced without consequent loss of reliability and functionability and without requiring greatly increased or unacceptably expensive quality control costs.

SUMMARY OF THE INVENTION

The present invention relates generally to the field of automatic derailleur shifters, and more particularly, is directed to an automatic shifter having a small hydraulic cylinder that is capable of mass production without requiring such close tolerances as to result in greatly increased quality control expenditures.

The present invention relates to an improved automatic derailleur shifter of the type disclosed in U.S. Pat. No. 4,599,079. The novel hydraulic cylinder has been described in conjunction with an automatic derailleur shifter, but the principles embodied herein should not be limited to only such use. Accordingly, hydraulic cylinders produced in accordance with the teachings of the present invention could be widely employed for use in other mechanisms and environments.

The hydraulic cylinder of the present invention is particularly designed for high speed production and includes operating elements which are capable of interacting in a manner to control the flow of hydraulic fluid through and about the piston in a precise manner. The functioning parts comprising the hydraulic cylinder are capable of being mass produced without requiring tolerances so close as to be incapable of being maintained when employing high speed machines of the type currently available for the mass production of small, plastic, rubber and metallic parts.

In the present design, the piston is separated into movable and nonmovable piston elements. A concentric hydraulic channel is provided in the movable piston element and a communicating, radially offset, longitudinal hydraulic channel is formed in the nonmovable piston element to permit fluid flow through the piston when the piston is moved. The diameter of the radially offset, longitudinal channel can be precisely controlled during the channel drilling process by employing a drill bit of exactly the desired size. This provides for exact channel dimensions to permit the restricted passage of a preselected quantity of hydraulic fluid at a precisely controlled flow rate to thereby monitor and control the rate of change of the automatic derailleur shifter during the gear changing process. With the exception of the single, precisely dimensioned, longitudinal flow channel, all of the other hydraulic fluid passages in and about the piston are designed for proper functioning without close tolerances. This new design thereby eliminates the major cause of rejection of the prior art style of hydraulic cylinders due to inability to maintain the required tolerances.

The movable element of the piston is provided with a central bore of size larger than the diameter of the piston rod to permit free movement of the movable piston element relative to the piston rod and free passage of the hydraulic fluid between the movable piston element and the piston rod. The movable piston element comprises a resilient, radially flaired skirt which peripherally bears against and slides over the interior periphery of the cylinder wall. This element prevents the flow of hydraulic fluid between the outer periphery of the movable piston element and the inner periphery of the cylinder wall when the movable piston element is downwardly urged. Accordingly, when the piston is downwardly moved relative to the cylinder, all hydraulic fluid flows through the central bore or channel of the movable piston element in substantially unrestricted manner and none of the hydraulic fluid can escape about the outer periphery of the movable piston element. A communicating, radially offset, longitudinal hydraulic channel is precisely drilled or otherwise formed through the fixed or nonmovable piston element to allow a precisely controlled flow of a preselected small quantity hydraulic fluid through the piston. This channel is closed by the interaction of the bottom of the nonmovable piston element and the top of the movable piston element when closing forces are applied upon the piston rod. Accordingly, only that quantity of hydraulic fluid that can flow through the piston radially offset channel will be permitted to pass through under these conditions.

When the piston rod is pulled in the opposite direction by the external forces from the automatic derailleur shifter applied thereto, the movable piston element will be pulled away from the nonmovable piston element, thereby opening the small radial channel and allowing free, unrestricted flow of the hydraulic fluid about the nonmovable piston element and through the bore or concentric channel in the movable piston element. Accordingly, the piston of the hydraulic cylinder can be readily constructed when using mass production techniques in a manner to eliminate substantially all close tolerance requirements whereby proper functioning of the cylinder upon assembly can be substantially assured with only minimum quality control procedures required.

It is therefore an object of the present invention to provide an improved automatic derailleur shifter of the type set forth.

It is another object of the present invention to provide a novel automatic derailleur shifter including a hydraulic cylinder wherein the piston can be manufactured by using mass production techniques in a manner which substantially eliminates the need for maintaining close tolerances.

It is another object of the present invention to provide a novel automatic hydraulic cylinder which comprises a cylinder, hydraulic fluid stored within the cylinder, a piston rod movable within the cylinder, a piston affixed to one end of the piston rod, the piston comprising a fixed piston element and a movable piston element, the movable piston element being provided with a central bore to loosely overfit the piston rod, the bore being greater in diameter than the outer diameter of the piston rod to define a hydraulic channel therebetween to allow free flow of hydraulic fluid through the bore, a restrictive, radially offset, longitudinal channel provided in the fixed piston element to restrict hydraulic fluid flow from the bore, the movable piston element further being provided with a flaired skirt in peripheral contact with the cylinder wall to facilitate movement of the piston relative to the cylinder without permitting passage of hydraulic fluid between the outer periphery of the movable piston element and the inner periphery of the cylinder sidewall.

It is another object of the present invention to provide an improved automatic derailleur shifter for a bicycle transmission including roller means to sense tension forces in the bicycle chain, movable arm means carrying the roller means and being pivotally movable in response to changes in chain tension forces as sensed by the roller means, cable means between the movable arm means and the derailleur to move the derailleur when the movable arm means is pivotally move, spring means to normally bias the roller means against the chain and stabilizing means to retard movement of the movable arm means in a clockwise direction to urge the roller means toward the bicycle chain.

It is another object of the present invention to provide a novel automatic derailleur shifter for a bicycle transmission that is simple in design, rugged in construction and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3 is an elevational view of the hydraulic cylinder of the present invention shown in use in conjunction with an automatic derailleur shifter affixed to a bicycle frame, the frame being shown in phantom lines for purposes of association.

FIG. 4 is an enlarged, perspective, exploded view of the hydraulic cylinder, partly broken away to show interior construction details.

FIG. 5 is an enlarged, partial, cross sectional view showing the relationship of the operating parts of the piston when the piston rod is being depressed.

FIG. 6 is a cross sectional view similar to FIG. 5 showing the position of the piston elements as the piston is upwardly urged relative to the cylinder.

FIG. 7 is an enlarged, bottom perspective view of the movable piston element.

FIG. 8 is an enlarged, top perspective view of the movable piston element of FIG. 7.

DESCRIPTION OF THE PREFERRED EMBODIMENT OF THE INVENTION

Figure 1:
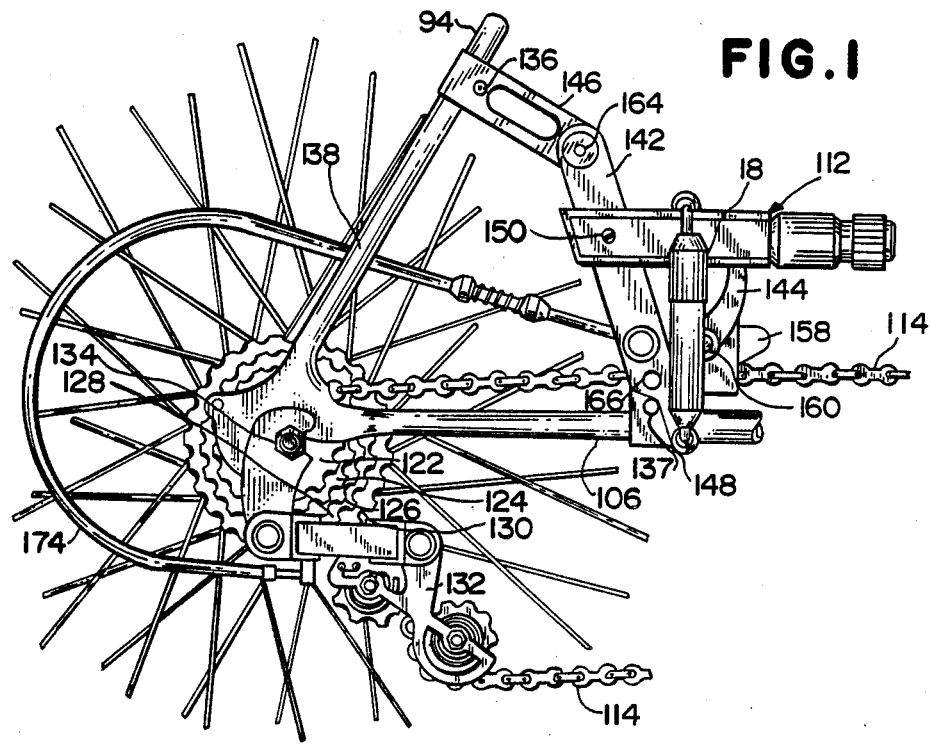
FIG. 1 is a partial side elevational view of an automatic derailleur shifter for a bicycle transmission in accordance with the present invention, showing the upper run of the bicycle chain in a substantially stressed, linear condition.

Although specific terms are used in the following description for the sake of clarity, these terms are intended to refer only to the particular structure of the invention selected for illustration in the drawings, and are not intended to define or limit the scope of the invention.

Figure 2:
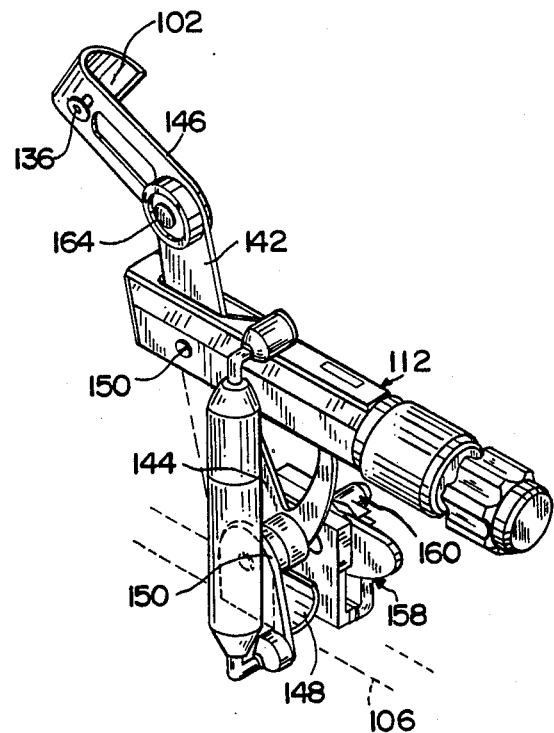
FIG. 2 is an enlarged, perspective view of the improved automatic derailleur shifter.

Referring now to the drawings, there is illustrated in FIGS. 1 and 2 a portion of a bicycle which comprises generally a frame 138 and a bicycle chain 114 which is rotatively driven by one or more large drive gears. A pair of right and left pedals are arranged to supply rotative energy to the large drive gear for chain rotative purposes in the usual manner. Usually a pair of large drive gears are utilized in conventional manner to provide for the common ten speed or twelve speed bicycle transmissions. It will be appreciated, however, that only a single large drive gear is necessary to function the automatic derailleur shifter 112 of the present invention, as hereinafter more fully set forth.

In well known manner, a plurality of small cluster gears 122, 124, 126, 128, 130 are rotatively carried on the rear bicycle axle 134 in the usual manner for selective engagement by the bicycle chain 114 as controlled by the indexing function of a usual derailleur 132, which derailleur is conventionally secured adjacent to the rear axle 134 in usual manner.

Still referring to FIGS. 1 and 2 and additionally considering FIG. 3, the automatic derailleur shifter 112 of the present invention comprises generally a stationary, frame connected arm 142, which arm is intended to be fixedly secured to the frame 138 of the bicycle. As best seen in FIG. 3, the fixed arm 142 comprises a first bent clamp 102 for convenient connection upon a rearwardly positioned strut 94 of the bicycle frame 138. The frame connected arm 142 may be easily secured to the bicycle frame 138 simply by securing the first and second clamps 102, 148 to existing struts 94, 106 of the bicycle frame 138.

Still referring to FIGS. 1 and 2, a movable shifter arm 144 is preferably fabricated of strong, planar, relatively lightweight material such as sheet steel or aluminum and is pivotably interconnected with the frame connected arm 142 through an affixed pivot pin 150. The frame connected arm 142 is provided with a pivot opening in position to receive a pivot pin to facilitate clockwise and counter-clockwise rotation of the movable shifter arm 144 relative to the frame connected arm 142.

Still referring to FIG. 1 and additionally considering FIGS. 2 and 3, the improved derailleur shifter 112 of the present invention comprises generally a stationary, frame connected arm 142, which arm is intended to be fixedly secured to a strut 94 of the frame 138. As illustrated, the fixed arm 142 comprises an elongated bent arm 146 for convenient connection upon the strut 94 of the bicycle frame 138. The frame connected arm 142 terminates forwardly in a forward bent clamp 148 of dimensions suitable to overfit and secure upon a spaced lower portion 106 of the bicycle frame 138. The bent clamps, 102, 148 are pivotal about the arm 142 through respective pivot pins 164, 166. The frame connected arm 142 may be easily secured to the bicycle frame 138 simply by tightening the set screws 136, 137 in the usual manner. For optimum orientation of the improved derailleur shifter 112, the rearward bent arm 146 is fabricated longer than the forward bent clamp 148. This arrangement allows the chain slider or follower 158 to be more forwardly positioned along the chain 114 to facilitate operation of the device with the large transmissions gears (not shown).

The movable shifter arm 144 forwardly carries a follower shaft 160 upon which a chain slider or follower 158 is freely mounted in a manner to permit both rotary movement about the shaft and angular cocking relative to the axis of the shaft. The limited angular movement of the chain slider 158 relative to the follower shaft 160 is responsive to the chain indexing operation of the derailleur 132. As illustrated in FIG. 1, the chain slider or follower 158 is positioned to normally bias downwardly against the upper run of the endless bicycle chain 114 for torque sensing purposes in the manner hereinafter more fully explained.

A coil spring (not shown) could be positioned about the pivot pin 150 to bias the movable shifter arm 144 relative to the fixed arm 142. The geometry of the system is such that a spring continuously biases the movable shifter arm 144 about the pivot pin 150 in a clockwise direction to thereby normally urge the chain slider or follower 158 into engagement with the upper run of the bicycle chain 114. When the chain 114 is relatively unstressed, for example when the bicycle is traveling either along a horizontal plane or on a downhill incline, the spring functions to urge the follower 158 downwardly against the upper run of the chain 114 to thereby depress the chain in a general V-shape and take up any slack in the system.

When the bicycle is being pedalled uphill so that the rider (not illustrated) has to apply more energy at the bicycle pedals, the added torque will be applied directly upon the upper run of the chain 114 for bicycle propelling purposes and any slack in the upper run of the chain will be removed due to the additional applied torque in the system. This will result in a tendency to straighten the upper run of the chain to approach linearity as additional torque is applied at the pedals. As the applied torque causes the upper chain run to approach linearity, this will function to raise the chain follower 158 against the bias of the spring. When the chain follower 158 is thus raised by the applied torque on the chain, it will simultaneously cause a counter-clockwise rotation of the follower affixed movable shifter arm 144 about the frame affixed stationary arm 142. This in turn causes the shifter arm cable 174 to index the derailleur 132 to cause the chain 114 to engage the proper gear 122, 124, 126, 128 or 130.

Referring now to FIGS. 4, 5 and 6, there is shown a hydraulic cylinder 10 of the type designed and constructed in accordance with the teachings of the present invention as applied to an external working mechanism, for example, an automatic derailleur shifter 112 of the type illustrated and described in U.S. Pat. Nos. 4,599,079 and 4,693,700. The hydraulic cylinder 10 comprises generally a hollow, cylindrical body or jacket 14 having affixed thereto a bottom connector or fixed arm 16. The upper end of the hollow body 14 is closed with a cap 18 through which a piston rod 20 is reciprocally movable.

A suitable upper fitting or bushing (not shown) is secured within the upper end of the cap 18 and is provided with a bore of suitable diameter to serve as a bearing to allow sliding movement of the piston rod 20 relative to the cylinder body 14. One or more O-ring gaskets 26 are employed in the usual manner to prevent leakage of the hydraulic fluid 28 at or about the upper fitting or bushing. The piston rod 20 is upwardly bent to define a connector 30 which may include end threads 32 in usual manner to facilitate connecting the hydraulic cylinder 10 into the operating parts of an automatic derailleur shifter 112 or other suitable mechanism when so desired.

Similarly, the bottom connector 16 may include a bent end 34 and end threads 36 in the same manner for easy interconnection of the cylinder 10 with the remainder of the derailleur shifter 112 or other system in well known manner. The piston rod 20 terminates within the cylinder body 14 in an end threaded section 38 for connection of the movable and nonmovable piston elements in the manner hereinafter set forth.

Still referring to FIGS. 5 and 6, it will be noted that a dual element piston 42 is operatively affixed to the bottom of the piston rod 20 at the bottom threads 38 thereof. As shown, the piston 42 is fabricated of two interacting parts and comprises generally a fixed piston element 44 and a movable piston element 46.

The fixed piston element 44 is fabricated to include a threaded bore 48 of corresponding size to threadedly engage the piston rod 20 at the upper end of the threaded section 38. The outer diameter 50 of the fixed piston element 44 is especially designed to be smaller than the inner diameter 52 of the hollow cylinder body or jacket 14. The difference in size between the fixed piston element 44 and the cylinder wall 52 defines therebetween an annular hydraulic fluid flow passage 54 of necessary dimensions to permit substantially unrestricted hydraulic fluid flow therethrough. As the piston 42 is moved toward its first upper position 56 as illustrated in FIG. 6, the hydraulic fluid 28 will freely flow through the annular channel or first hydraulic fluid passage 54. It will be appreciated that as the piston rod 20 is moved upwardly within the body or jacket 14 as indicated by the arrow 78, substantially all hydraulic fluid flow will pass through the peripheral clearance space 54 about the outer periphery of the fixed piston element 44. There will be no fluid flow through the nonmovable piston element at or about its tight interconnection with the piston rod 20 above the threaded end 38.

As shown in FIGS. 5 and 6, a bottom nut 60 or other suitable fastener is threadedly engaged upon the threaded end 38 of the piston rod 20 in spaced relationship from the fixed piston element 44 to define an operating clearance space 62 between the fixed piston element 44 and the movable piston element 46. A lock washer or other open type spacer 98 is provided intermediate the bottom nut 60 and the bottom of the movable piston element 46 to assure that the annular flow passage 68 is never completely obstructed. As shown, the movable piston element 46 is provided with a concentric bore 64 of a size larger than the outer diameter 66 of the piston rod 20 to define an annular, central hydraulic fluid passage 68 therebetween. Accordingly, when the piston rod 20 and the affixed dual element piston 42 are moved relative to the cylinder jacket 14, the hydraulic fluid 28 can flow through the central or second hydraulic fluid passage 68 in relatively unrestricted manner.

The movable piston element 46 comprises a generally solid, metallic, cylindrical body 70 having an outer diameter 72 of dimensions slightly smaller than the interior diameter 52 of the cylinder body 14 to permit easy movement of the movable piston element 46 relative to the cylindrical body or jacket 14 without friction. The solid body 70 includes a bottom circular recess 73 within which is seated a resilient, radially outwardly flared skirt 74 having an outer diameter 76 that is greater than the inner diameter 52 of the jacket 14. It is an important feature of this invention that the resilient, flared skirt 74 can fit within and scrape against the inner periphery of the jacket 14 as the piston rod 20 is reciprocated between its first upper position 56 (FIG. 6), and its second, lower position 58 (FIG. 5) in a manner to discourage or prevent the flow of hydraulic fluid between the outer periphery of the movable piston element 46 and the inner periphery of the cylinder body 14.

Accordingly, as the piston 42 and the piston rod 20 are downwardly urged relative to the cylinder body 14 as indicated by the arrow 86 in FIG. 5, the hydraulic fluid 28 will be forced through the central, annular hydraulic fluid passage 68 in a relatively free and unrestricted manner by the scraping or sealing sliding engagement of the outer periphery of the flared piston skirt 74 against the inner periphery of the cylinder or jacket 14. As shown in FIG. 6, when the piston rod 20 is urged upwardly as indicated by the arrow 78 toward its first upper position 56, the bottom peripheral surface 80 of the fixed piston element 44 will be spaced from the top peripheral surface 82 of the movable piston element 44. This spacing, in conjunction with the hydraulic fluid flow passage 54 thereby permits upwardly, substantially unrestricted movement of the hydraulic fluid 28 through the annular hydraulic fluid passage 68.

As best seen in FIGS. 5 and 6, the lower surface of the nonmovable piston element 44 is undercut by machining or otherwise to provide a radial, downwardly open, circular, hydraulic channel 84 of suitable width and depth to permit substantially unrestricted passage of hydraulic fluid 28. A precisely dimensioned, small diameter, radially offset, longitudinal channel or third hydraulic fluid passage 88 is drilled or otherwise longitudinally formed in the nonmovable piston element 44 and has its lower end in fluid communication with the circular channel 84. When the piston elements 44, 46 are urged together upon downward movement of the piston in the manner illustrated by the arrow 86 in FIG. 5, the interaction of the movable element top surface 82 upon the bottom peripheral surface 80 of the fixed element 44 will cause a seal sufficient to prevent fluid flow laterally between the elements 44, 46. All hydraulic fluid forced through the annular fluid passage 68 will thus be restricted and only the fluid that can travel upwardly through the small channel or third hydraulic fluid passage 88 can escape. This fluid restriction results in precisely controlled downward movement of the piston 42. The circular hydraulic channel 84 communicates between the central, annular hydraulic fluid passage 68 through the movable element concentric bore 64 and the longitudinal, offset, small channel 88 to provide a communicating fluid path or fourth hydraulic fluid passage through the dual element piston 42.

When the piston 42 is moved downwardly in the direction of the arrow 86, (FIG. 5) hydraulic fluid 28 cannot pass about the outer periphery of the movable piston element 46 because of the function of the flared skirt 74 and therefore must flow through the annular hydraulic fluid passage 68 in relatively unrestricted manner. The restriction of the flow of hydraulic fluid occurs at the longitudinal channel 88 when the piston is moved in the direction of the arrow 86. By fabricating the longitudinal, offset, small channel 88 of slightly greater dimensions, more hydraulic fluid 28 can be caused to flow therethrough. Conversely, by minimizing the size of the longitudinal channel 88, less hydraulic fluid can flow. Under the circumstances, by carefully controlling the cross sectional area of the longitudinal channel 84, the operation of the hydraulic cylinder 10 can be precisely designed without great concern with the tolerance or precise dimensions of the other parts.

When the dual element piston 42 is upwardly moved in the direction of the arrow 78 as shown in FIG. 6, it will be appreciated that the movable piston element 46 will be moved away from the fixed piston element 44 to define the piston movement space 62 intermediate the bottom peripheral surface 80 of the fixed piston element 44 and the top peripheral surface 82 of the movable piston element 46. This movement completely opens and unrestricts the radial hydraulic channel 84. With the piston 42 and piston rod 20 moving upwardly in the direction of the arrow 78, the hydraulic fluid 28 can readily pass through the peripheral clearance space 54 which is defined between the outer periphery of the fixed piston element 44 and the inner periphery of the cylinder jacket 14. The fluid then passes through the narrow clearance space 90 defined between the fixed and movable piston elements 44, 46 and through the central annular hydraulic fluid passage 68 which is defined between the movable piston element 46 and the piston rod 20 in a substantially unrestricted manner. Some hydraulic fluid additionally may pass about the outer periphery 76 of the flared skirt 74 to further provide for unrestricted piston movement in the direction of the arrow 78.

Thus it is seen that there is substantially free flow of the hydraulic fluid 28 through and about the dual element piston 42 when the parts are moved in the direction of the arrow 78 as shown in FIG. 4. When the piston rod 20 and dual element piston 42 are moved downwardly relative to the cylinder body 14 as illustrated by the arrow 86 in FIG. 5, the movable piston element 46 will be urged tightly against the fixed piston element 44 to thus provide a bottom seal or closure for the hydraulic channel 84 to thereby severely restrict the flow of hydraulic fluid 28 relative to the piston 42 through only the narrow, longitudinal, offset channel 88. It has been found desirable to maintain the clearance space 90 between the piston elements 44, 46 to a minimum thickness, for example, on the order of 0.017 inches, to minimize unwanted changing of the gears 122, 124, 126, 128, 130 of a ten or twelve speed bicycle upon changes in the amount of torque applied to the bicycle chain 114.

Referring again to FIGS. 4, 5 and 6, a coil spring 92 is provided interiorly of the cylinder 10 and is sized and positioned to bias between the bottom of the lock nut 60 and the inner surface 100 of the cylinder bottom wall. This spring 92 has been found to offer a greatly improved ride by providing additional stabilization to the operation and function of the piston 42. On the up stroke of the piston as illustrated in FIG. 6, a slight vacuum will be created by the piston movement and the spring 92 will function to hold the piston part momentarily to initially enhance the flow of the hydraulic fluid 28 in and about the piston elements 44, 46.

Upon the downward stroke of the piston 42 as shown in FIG. 5, the spring 92 functions to add a small additional resistance to piston movement. The amount of added resistance will be a function of the spring constant, which spring constant can be readily changed to suit the strength and desires of the individual rider. The additional resistance to the downward descent of the piston 22 offsets to a limited degree some of the pressure of the movable cam arm 144 adjusting spring to balance out the forces in a manner to give the user additional control over the operation of the shifter.

Without the additional forces generated by the coil spring 92, the piston 42 could have a tendency to drop too fast and thereby possibly cause fluctuation of the shifter between a higher and lower gear when actually it would be more advantageous and desirable for the shifter to remain in one gear. The spring 92 tends to hold the chain 114 on the gear selected for a slightly longer period of time to allow the hydraulic oil to flow. For example an increase in pressure will cause an upshift from third gear to second gear. Upon momentarily release of the pressure, the system ordinarily would function to index back from second gear to third gear. However, the spring 92 will retard the shift back and will cause the chain to the hold on to second gear for a little longer to allow the hydraulic fluid time to pass the piston and thereby create an additional stabilizing effect. Of course, if the road conditions indicate that the pressure change was not momentary, then the system would function to deliberately move the chain to engage upon the optimum gear.

Although the invention has been described with a certain degree of particularity, it is understood that the present disclosure has been made only by way of example, and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. Automatic derailleur shifter for use with a bicycle of the type having a frame, gears, or chain rotatable about the gears, or derailleur to shift the chain from gear to gear, a shifter having a fixed arm connected to the frame and a movable arm povitable about the fixed arm and being connected to the derailleur through a flexible cable, the improvement comprising a hydraulic cylinder, containing hydraulic fluid therewithin the hydraulic cylinder being connected intermediate the fixed arm and the movable arm, the hydraulic cylinder comprising a hollow, cylindrical body having an interior periphery;

a piston rod reciprocal within the body, the piston rod terminating in a piston receiving end, a dual element piston secured to the piston rod and being adapted for movement within the hollow interior of the cylindrical body between a first, downward position and a second, upward position, the piston comprising a fixed piston element and a movable piston element, the fixed piston element being secured to the piston rod in spaced relationship from the piston rod end, the fixed piston element having an outer diameter that is less than the inner diameter of the cylindrical body, the outer diameter of the fixed piston element and the inner diameter of the cylindrical body defining a first hydraulic fluid passage therebetween to permit substantially unrestricted hydraulic fluid flow therethrough, the fixed piston element comprising a downwardly extending, bottom, peripheral flange, the flange contacting the movable piston element when the piston is moved to the said first, downward position, the flange not contacting the movable piston element when the piston is moved to the said second, upward position, the movable piston element being provided with a central bore of diameter larger than the diameter of the piston rod, the central bore receiving a portion of the piston rod therethrough, the central bore defining a second substantially unrestricted, hydraulic fluid passage, the bottom peripheral flange, the fixed piston element and the movable piston element defining a fourth hydraulic fluid channel therebetween when the piston is moved to the said first, downward position; and restrictive channel means provided in the fixed piston element to form a third, restricted hydraulic fluid channel through the fixed piston element, the restrictive channel means being in fluid communication with the first hydraulic fluid passage and the fourth hydraulic fluid passage when the piston is moved to the first, downward position and being in fluid communication only with the first hydraulic fluid passage when the piston is moved to the, second, upward position.

2. The automatic shifter of claim 1 wherein the fixed piston element is separated from the movable piston element in the said second, position to define a clearance space between the fixed and movable piston elements, the clearance space intercommunicating between the first, second and third hydraulic fluid passages whereby hydraulic fluid freely flows through the first, second and third hydraulic fluid passages when the piston is moved to the second, upward position.

3. The automatic shifter of claim 2 wherein the fixed piston element is in contact with the movable piston element in the said first, downward position whereby only a restricted quantity of hydraulic fluid can flow through the said third restrictive hydraulic fluid channel when the piston is moved to the first, downward position.

4. The automatic shifter of claim 1 and sealing means in the movable piston element to provide a sliding, sealed junction between the movable piston element and the interior periphery of the cylindrical body.

5. The automatic shifter of claim 4 wherein the sealing means comprises a flexible, radically outwardly flared skirt, at least a portion of the skirt having an outer diameter that is greater than the inner diameter of the cylindrical body when it is not inserted within the cylindrical body.

6. The automatic shifter of claim 1 and a bottom fastener secured to the piston rod below the piston, the movable piston element being movable along the piston rod between the bottom fastener and the fixed piston element.

7. The automatic shifter of claim 6 and an open spacer interposed between the movable piston element and the bottom fastener, the open spacer being adapted to assure that the second hydraulic passage is never completely obstructed by interaction of the movable piston element and the bottom fastener.

8. The automatic shifter of claim 6, wherein the cylindrical body comprises a closed bottom and a spring biasing between the said closed bottom and the piston, the spring continuously biasing the piston in a direction away from the closed bottom.

* * * * *